Oct. 23, 1951  V. J. BURNELLI  2,572,442
TWIN ENGINE SPORT AIRPLANE
Filed Oct. 29, 1946
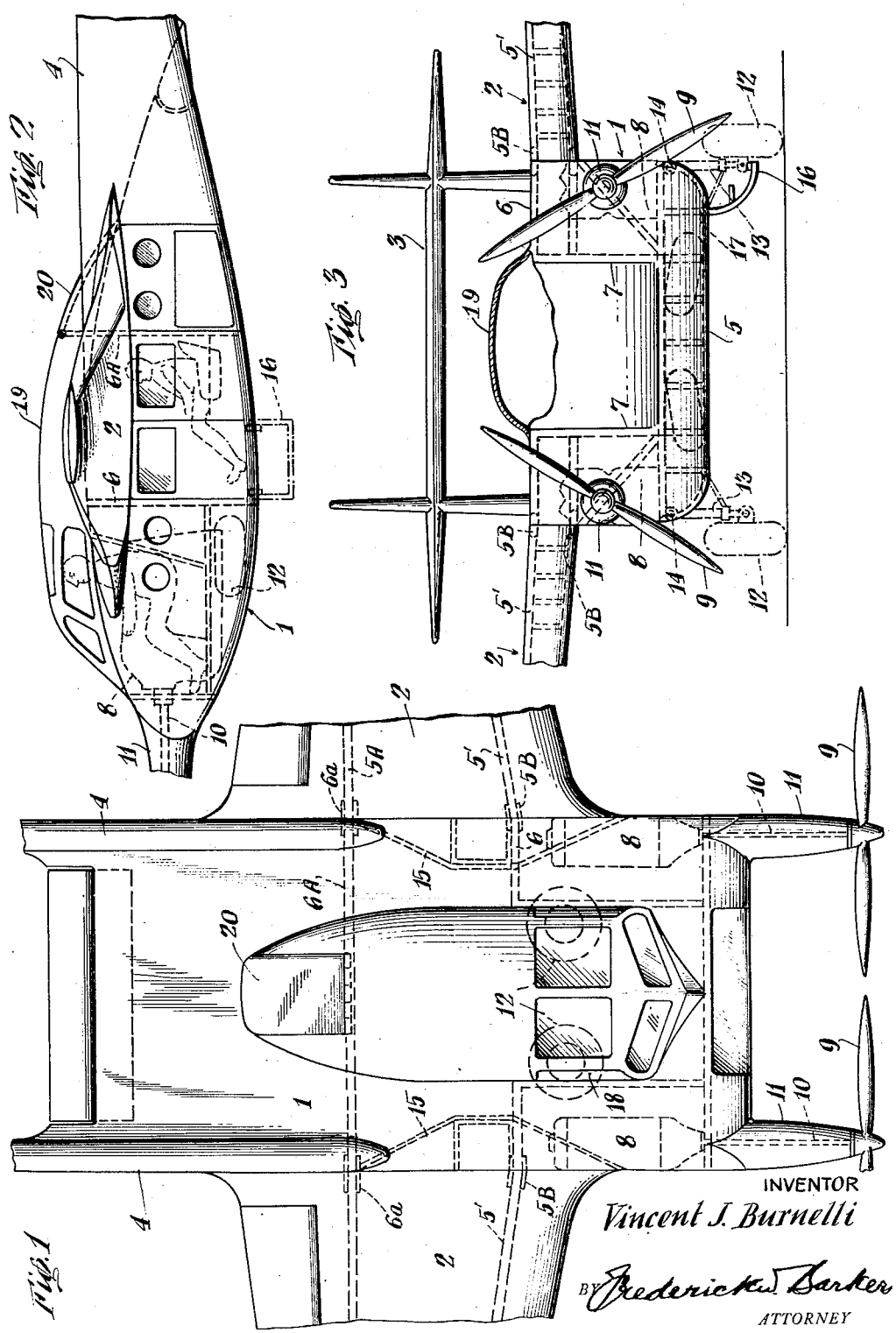
INVENTOR
Vincent J. Burnelli
BY Frederick W. Barker
ATTORNEY Patented Oct. 23, 1951

2,572,442

UNITED STATES PATENT OFFICE 2,572,442

TWIN ENGINE SPORT AIRPLANE

Vincent J. Burnelli, Red Bank, N. J.

Application October 29, 1946, Serial No. 706,390

1 Claim. (Cl. 244—118)

This invention relates to aircraft of the Burnelli type wherein the central wing section provides the fuselage element for the concealment of the power plant and useful load and which is of wing contour.

The improvement, related to cabin and other appointments, applies to a type of small personal plane which will provide the safety advantages inherent in this class of design which is further contributed by the duplex power plant with the design power loading sufficiently low to permit efficient flight with good control on one engine, as demonstrated by the larger type Burnelli transports.

It is my intention for the size of aircraft illustrated, for the accommodation of 4 passengers and 2 pilots and equipped for example with 2 200 H. P. engines, to incorporate structural features that will make passenger entrance and accommodation more convenient and with improved visibility. In order to keep the frontal area in proportion to horse power compared to the larger designs of the lifting body type the cabin height provides for limousine seating arrangement, or approximately 4'3".

In order to provide improved entrance means in this small design, an offset longéron structure is arranged to permit clearance for a cutout in the floor in line with the entrance aisle forward of the passenger seats. This is combined with a cover and step that is lowered when the cabin door in the side of the aircraft is opened so that the person entering can move inboard clear of the wing and have full standing head room for entrance.

A further feature for accommodation is provided in the bulkhead construction in order that the pilot on entering the cabin will have increased headroom with no bulkhead structural interference below the upper surface of the pilot's hatch.

To accomplish this a U-section bulkhead is provided by which the wing loads are transferred through the U formation of structure which may be of shear web design, thereby avoiding the imposition of a cross member that would cause interference for entrance into the pilot's section. A similar arrangement can be provided for the rear spar bulkhead to permit entrance to the cabin from the rear, thereby avoiding the side doors. This cabin opening is provided in the hatch roof and has a cover hinged to open upwardly for entrance and exit.

A further feature in the structure is provided through the arrangement of the side walls of the pilot's section which separate the engine and landing gear compartments from the pilot's section with openings provided therein opposite the pilot's compartment for access to these installations for inspection and minor adjustments.

Other features and advantages of my invention will hereinafter appear.

In the drawing:

Figure 1 is a partial top plan view of my improved airplane.

Fig. 2 is a side sectional view thereof, and

Fig. 3 is a partial sectional front view.

In said views let 1 indicate the central or body portion of the airplane, which is of airfoil contour, as in the larger, Burnelli type lifting fuselage airplanes. The outspanned wings 2 are shown (broken away) in Figs. 1 and 3, and the tail group 3 is indicated as carried by booms 4.

An essential feature in this new design airplane comprises a U-shaped bulkhead wing spar, indicated at 5, which is a continuation of the front bulkhead 6, and rear bulkhead 6A which is a continuation of rear spar 5A that carries the outspanned wings 2. The U-shaped portion 5 of the spar avoids interference with the cabin interior, because this U-shaped portion, which outlines the inner contour of the body, leaves a clear space above its base for passenger accommodation, this being important by reason of the relatively limited height within the fuselage—while maintaining the desired structural strength which is afforded by said U-shaped spar.

The wing spars 5A are extended through the sides of the body 1 and are united with rear bulkhead 6A as by fittings 6a; while the ends of the U-shaped spar 5 or front bulkhead 6 are united with the spar 5' as by fittings 5B.

Engines, indicated at 8, are located in the body 1, in spaces provided therefor between the cabin walls 7 and the side walls of said body, said engines operating propellers 9 by engine shafts 10 that are contained within extended housings 11.

Traction wheels 12, carried by hangers 13 that are journalled at 14 in the body 1, are adapted to be swung into recesses provided for their reception in the base of said body.

In order to increase the entrance height for persons entering and leaving the cabin, the longérons, at one or both sides of the body, are offset, as at 15, and in said offset portion a step 16, hinged at 17, is adapted to be swung downwardly, as appears in dotted lines in Fig. 2.

So that the pilot may have access to the engines, for inspection and adjustment, the walls 7 are provided with openings 18, which may have removable covers.

The hatch roof, 19, is shown at its rear portion as provided with a hinged cover 20 for an opening that enables entry and exit for the pilot.

Variations within the spirit and scope of my invention are equally comprehended by the foregoing disclosure.

I claim:

An airplane fuselage of airfoil contour from the opposite sides of which extend outspanned wings, said fuselage including inwardly offset longérons and forward and rearward spars extending respectively through the fuselage and outspanned wings, passenger seats located between said spars and said fuselage provided with an entrance in the side thereof at the offset in a longéron, and the fuselage having a depressed portion of its floor structure adjacent the entrance, and a depressible step in communication with said depressed portion and when in depressed position disposed beneath the fuselage to thereby enable a person to stand erect when entering and leaving the fuselage.

VINCENT J. BURNELLI.

REFERENCES CITED

The following references are of record in the file of this patent:

UNITED STATES PATENTS

| Number | Name | Date |
| --- | --- | --- |
| 1,758,498 | Burnelli | May 13, 1930 |
| 1,799,778 | Burnelli | Apr. 7, 1931 |
| 1,816,678 | Hilton | July 28, 1931 |
| 1,874,610 | Payne | Aug. 30, 1932 |
| 1,916,092 | Bleriot | June 27, 1933 |
| 1,998,487 | Burnelli | Apr. 23, 1935 |
| 2,037,805 | Linstedt | Apr. 21, 1936 |
| 2,417,987 | McFarland | Mar. 25, 1947 |
| 2,425,499 | Watter | Aug. 12, 1947 |